United States Patent
Volponi (10) Patent No.: US 7,233,884 B2
(45) Date of Patent: Jun. 19, 2007

(54) METHODOLOGY FOR TEMPORAL FAULT EVENT ISOLATION AND IDENTIFICATION

(75) Inventor: Allan J. Volponi, West Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 872 days.

(21) Appl. No.: 10/286,504

(22) Filed: Oct. 31, 2002

(65) Prior Publication Data

US 2004/0153815 A1 Aug. 5, 2004

(51) Int. Cl.
*G06F 19/00* (2006.01)

(52) U.S. Cl. ............................ 702/189; 702/33; 702/34

(58) Field of Classification Search ................ 702/33, 702/34, 189
See application file for complete search history.

(56) References Cited

U.S. PATENT DOCUMENTS

| | | | | |
|---|---|---|---|---|
| 4,698,780 | A | * 10/1987 | Mandel et al. | 187/393 |
| 4,911,006 | A | * 3/1990 | Hargarten et al. | 73/861.356 |
| 5,566,092 | A | 10/1996 | Wang et al. | |
| 5,594,180 | A | * 1/1997 | Carpenter et al. | 73/861.356 |
| 6,181,975 | B1 | 1/2001 | Gross et al. | |

FOREIGN PATENT DOCUMENTS

EP 1114991 A2 7/2001
WO 9741494 A1 11/1997

OTHER PUBLICATIONS

Daniel B. Grunberg et al., Generation of Optimal and Suboptimal Strategies for Multiple-Fault Isolation, Nov. 3, 1987, pp. 125-131, ALPHATECH, INC., Burlington, MA.

* cited by examiner

*Primary Examiner*—Edward Cosimano
(74) *Attorney, Agent, or Firm*—Bachman & LaPointe, P.C.

(57) ABSTRACT

A method of fault event identification which comprises the steps of receiving a plurality of parameter measurements, performing single fault isolation to establish one of the plurality of parameter measurements as an event start, one of the plurality of parameter measurements as an event detect, and one of the parameter measurements as an event end wherein a latency period extends from the event start to the event detect and a blackout period extends from the event start to the event end, performing multiple fault isolation to establish a first trend line for the plurality of parameter measurements prior to the blackout period and after the blackout period, reprocessing the parameter measurements in the latency period, processing the parameter measurements in the blackout period, calculating a model IC from the reprocessed parameter measurements, calculating a plurality of single fault vectors, calculating an estimate for each of the single fault vectors, calculating a normalized error for each of said plurality of single fault vectors, calculating a polarized error term for each of the plurality of single fault vectors, and selecting the single fault vector with smallest of the calculated normalized errors.

15 Claims, 8 Drawing Sheets

METHODOLOGY FOR TEMPORAL FAULT EVENT ISOLATION AND IDENTIFICATION

BACKGROUND OF THE INVENTION (1) Field of the Invention

The present invention relates to a method for isolating and identifying temporal fault events. More specifically, the present invention relates to a method of performing single fault isolation and detection in engine systems, and, if warranted, double fault isolation and detection.

(2) Description of Related Art

The goal of gas turbine performance diagnostics is to accurately detect, isolate and assess the changes in engine module performance, engine system malfunctions, and instrumentation problems from knowledge of measured parameters taken along the engine's gas path. Discernable shifts in engine speeds, temperatures, pressures, fuel flow, etc., provide the requisite information for determining the underlying shift in engine operation from a presumed reference (nominal) state. The aforementioned engine performance changes can manifest themselves in one of two categories: a) gradual (long-term) deterioration or b) rapid (short-term) deterioration.

Various techniques exist to detect the onset of short term, single fault conditions in a series of parameter measurements. Such short term anomalies are usually situated between periods of relative equilibrium during which long term degradation of engine or module components exhibit gradual deterioration. In addition, in rare instances, such short term anomalies are the result of double fault conditions involving the near simultaneous malfunctioning of two components. In order to accurately identify the cause of a single or double fault condition there is needed a method whereby measurement data recorded before, during, and after a fault condition is correctly identified as to its nature for use in subsequent fault identification. There is additionally needed a methodology whereby such measurement data may be analyzed to provide accurate identification of underlying fault conditions.

SUMMARY OF THE INVENTION

Accordingly, it is an object of the present invention to provide a method for isolating and identifying temporal fault events.

In accordance with the present invention, a method of fault event identification which comprises the steps of receiving a plurality of parameter measurements, performing single fault isolation to establish one of the plurality of parameter measurements as an event start, one of the plurality of parameter measurements as an event detect, and one of the parameter measurements as an event end wherein a latency period extends from the event start to the event detect and a blackout period extends from the event start to the event end, performing multiple fault isolation to establish a first trend line for the plurality of parameter measurements prior to the blackout period and after the blackout period, reprocessing the parameter measurements in the latency period, processing the parameter measurements in the blackout period, introducing a set of model Influence Coefficients (IC), interpolated at the power setting being analyzed, calculating a plurality of single fault vectors, calculating an estimate for each of the single fault vectors, calculating a normalized error for each of the plurality of single fault vectors, calculating a polarized error term for each of the plurality of single fault vectors, and selecting the single fault vector with smallest of the calculated normalized errors.

In accordance with the present invention, a method of fault event identification comprises the steps of receiving a plurality of parameter measurements, performing single fault isolation to establish one of the plurality of parameter measurements as an event start, one of the plurality of parameter measurements as an event detect, and one of the parameter measurements as an event end wherein a latency period extends from the event start to the event detect and a blackout period extends from the event start to the event end, performing multiple fault isolation to establish a first trend line for the plurality of parameter measurements prior to the blackout period and after the blackout period, reprocessing the parameter measurements in the latency period, processing the parameter measurements in the blackout period, calculating a matrix of Influence Coefficients (IC) from an aero-thermal model simulation of the engine, calculating a plurality of single fault vectors, calculating an estimate for each of the single fault vectors, calculating a normalized error for each of the plurality of single fault vectors, calculating a polarized error term for each of the plurality of single fault vectors, and determining if double fault calculation is required, calculating a plurality of double fault vectors, calculating an estimate for each of the plurality of double fault vectors, calculating a normalized error for each of the plurality of double fault vectors, calculating a polarized error term for each of the plurality of double fault vectors, comprising a smallest normalized error for each of the plurality of single fault vectors and a smallest normalized error for each of the plurality of double fault vectors.

BRIEF DESCRIPTION OF THE DRAWINGS

FIG. 4B—A logic diagram of the process steps of the present invention by which there is calculated an associated normalized error for each single fault estimate and generated polarized error terms.

FIG. 4C—A logic diagram of the process steps of the present invention by which the polarized error terms of the present invention are processed to select the fault estimate with the minimum computed error.

FIG. 4D—A logic diagram of the process steps of the present invention whereby normalized and polarized error terms for each possible double fault is calculated.

FIG. 4E—A logic diagram of the process steps of the present invention whereby it is determined whether to conclude the occurrence of a single or a double fault condition.

DETAILED DESCRIPTION OF THE PREFERRED EMBODIMENT(S)

Figure 5:
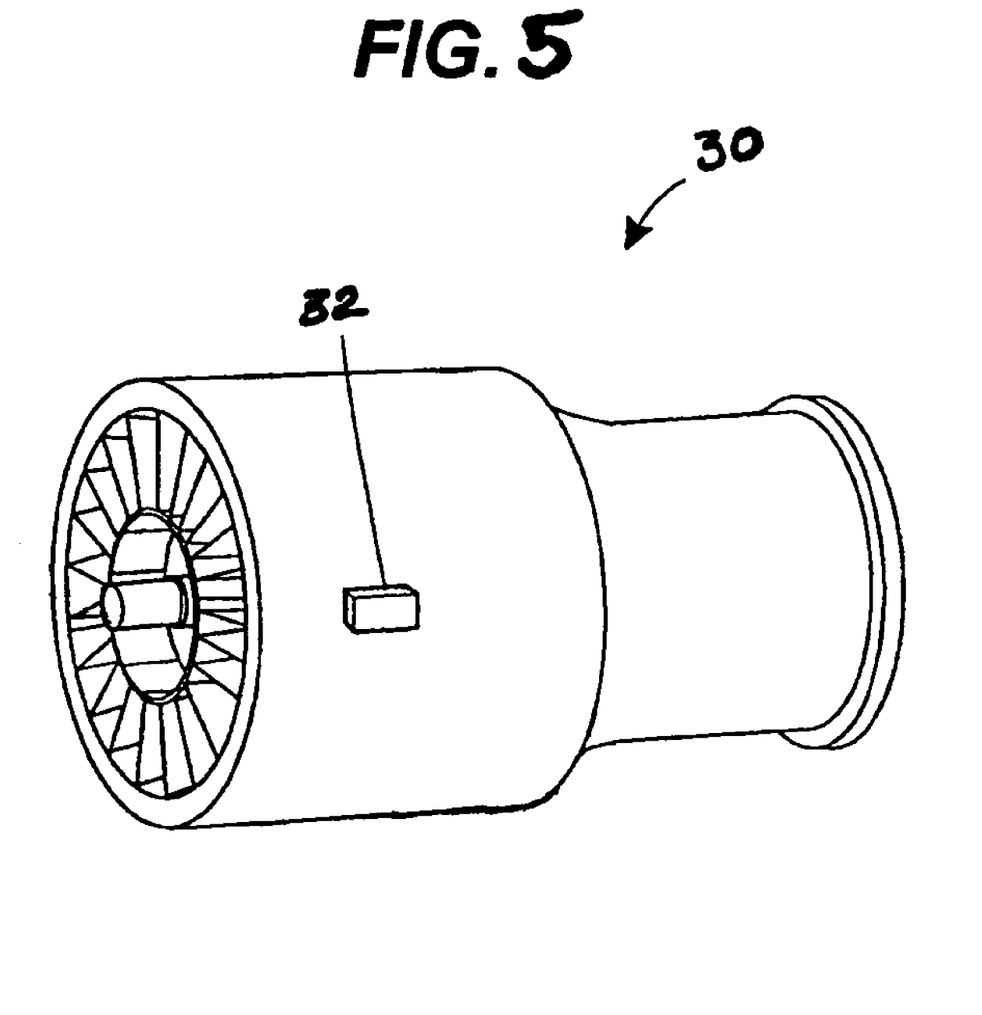
FIG. 5—An illustration of a gas turbine engine.

The present invention is drawn to isolating short-term deterioration in the instance where a fault event has been detected in a system. While described in the following with exemplary reference to gas path parameters in an engine 30 (FIG. 5), the present invention is broadly drawn to encompass any system comprised of a plurality of interoperating subsystems or modules 32 (FIG. 5) which may be measured and quantified during operation.

The problem of detection is one of recognizing a step or rate change in a gas path parameter or a collection of parameters. Methods to detect an engine performance event, or fault event, by virtue of detecting that a shift (or rapid change) in a set of measured engine parameters has occurred at some discrete time k are well known in the art.

As used herein, the algorithms that address the problem of estimating a) gradual deterioration and b) rapid (temporal) deterioration in gas turbine system performance are referred to as MFI (Multiple Fault Isolation) and SFI (Single Fault Isolation), respectively. The former implies that all of the engine components (whose shifts in performance are estimated) are deteriorating slowly, whereas the latter implies a concession, i.e. that a rapid trend shift is most probably due to a single entity (or perhaps two) going awry. The methodology of the present invention described more fully below allows for isolation and identification of single or double faults arising from a rapid deterioration of an engine subsystem.

It is advantageous to recognize a certain time latency in the detection process. If one denotes by $k_{start}$ and $k_{detect}$ the start and detection (discrete) times respectively of a temporal event, then it is generally true that $k_{detect} \neq k_{start}$. The reason for this is that it would not be prudent to declare an event detection on the basis of one data point since the point might be a statistical outlier. The notion of a Latency Period is therefore incorporated into the present invention in order to support both MFI and SFI processing. In addition to ascertaining detection time $k_{detect}$, it is also important to know when the event has concluded or stabilized. This time is denoted by $k_{end}$ and the trend detection algorithm, which is monitoring the measured parameters, estimates this time along with $k_{start}$. As used herein, "Blackout Period" refers to the period between the start and end of the detected event.

Figure 1:
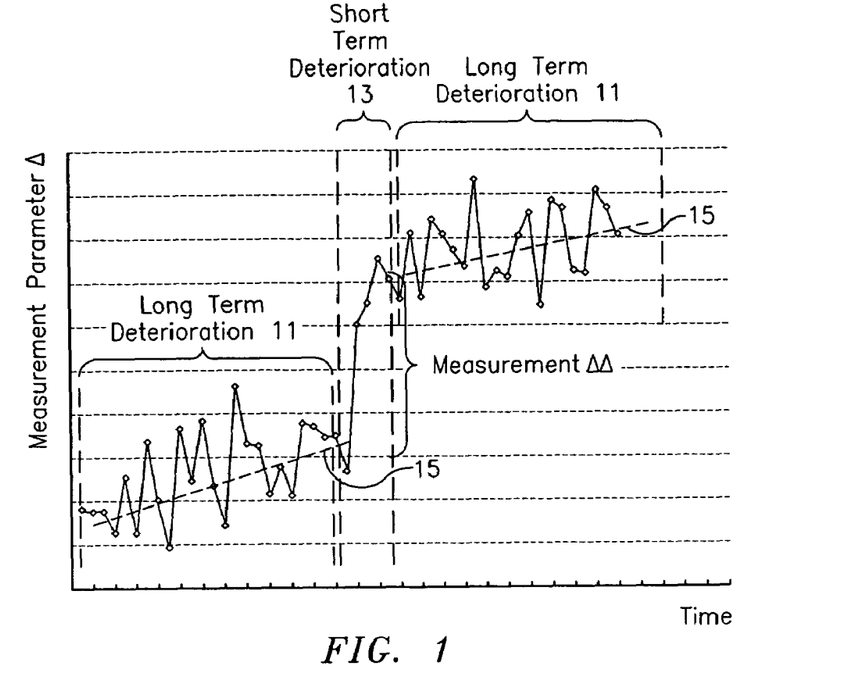
FIG. 1—An illustration of long-term and short-term deterioration of a hypothetical measurement parameter.

With reference to FIG. 1, there is presented a graphical illustration of long-term 11 and short-term 13 deterioration in terms of a hypothetical trending in an arbitrary measurement parameter Δ. Measurement parameter Δ is preferably a percent or other measured change between a current measurement and a reference parameter value representing a nominal baseline condition. Note that for both long term 11 deterioration periods there is computed a trend line 15. Trend lines 15 are preferably best fit lines derived from linear regression that capture the gradual rate of deterioration in a parameter's measurements, but can also be represented by moving or exponential averages.

Figure 2:
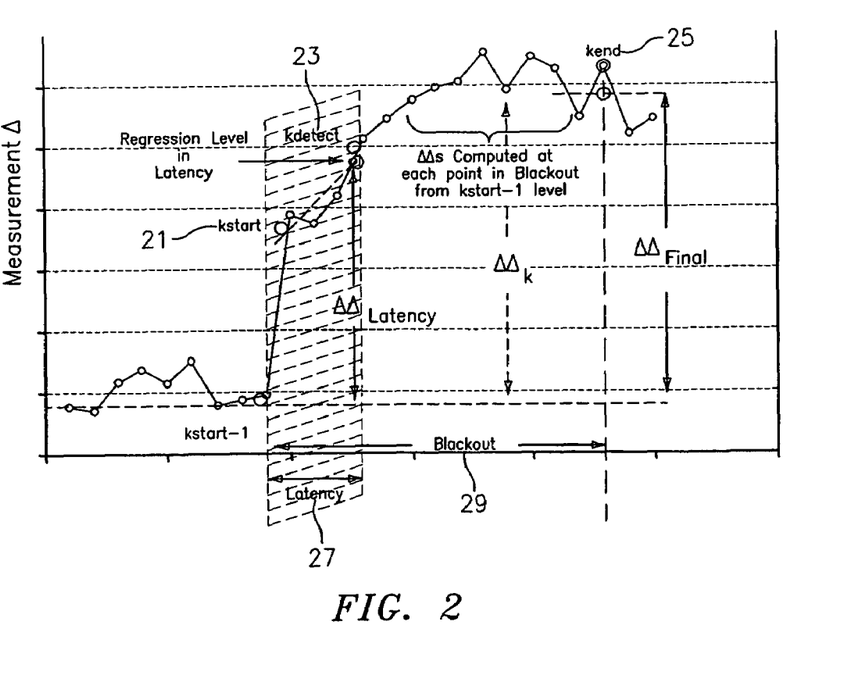
FIG. 2—An illustration of the latency period and blackout period associated with a single fault condition.

With reference to FIG. 2, there is illustrated a graphical representation of a short-term event, start 21 (kstart), detection 23 (kdetect) and end time 25 (kend) defining the Latency Period 27 and Blackout Period 29.

In such an exemplary scenario, processing (Fault Detection and Isolation) is taking place at each discrete time point. The default isolation process is taken to be the MFI (Multiple Fault Isolation), wherein performance changes (relative to reference) in the modules and sensors being monitored are inferred from the collection of measurement parameter changes (i.e., Δs from reference) at time k.

Examples of preferable methods of MFI include, but are not limited to, statistical based applications using Kalman Filters to methods employing Artificial Neural Networks.

Similarly, preferable SFI methods include, but are not limited to, statistical methods and methods incorporating Artificial Neural Networks.

The algorithm of the present invention possesses a plurality of properties as will be described more fully below. The algorithm allows for and accommodates the natural latency in the detection of a temporal event thereby mitigating the effects of concurrent MFI processing. The algorithm automatically accommodates single and double fault events. The algorithm automatically accommodates any measurement set or subset and it accommodates any set of pre-defined faults.

The SFI operates on temporal changes, i.e. measurement parameter ΔΔs, as indicated in FIG. 2. This provides a performance ΔΔ from the initiation of the event. The reference in this case is whatever the performance was at discrete time $k_{start}-1$. This is what distinguishes a short-term (event) deterioration from long-term (gradual) deterioration.

Figure 3:
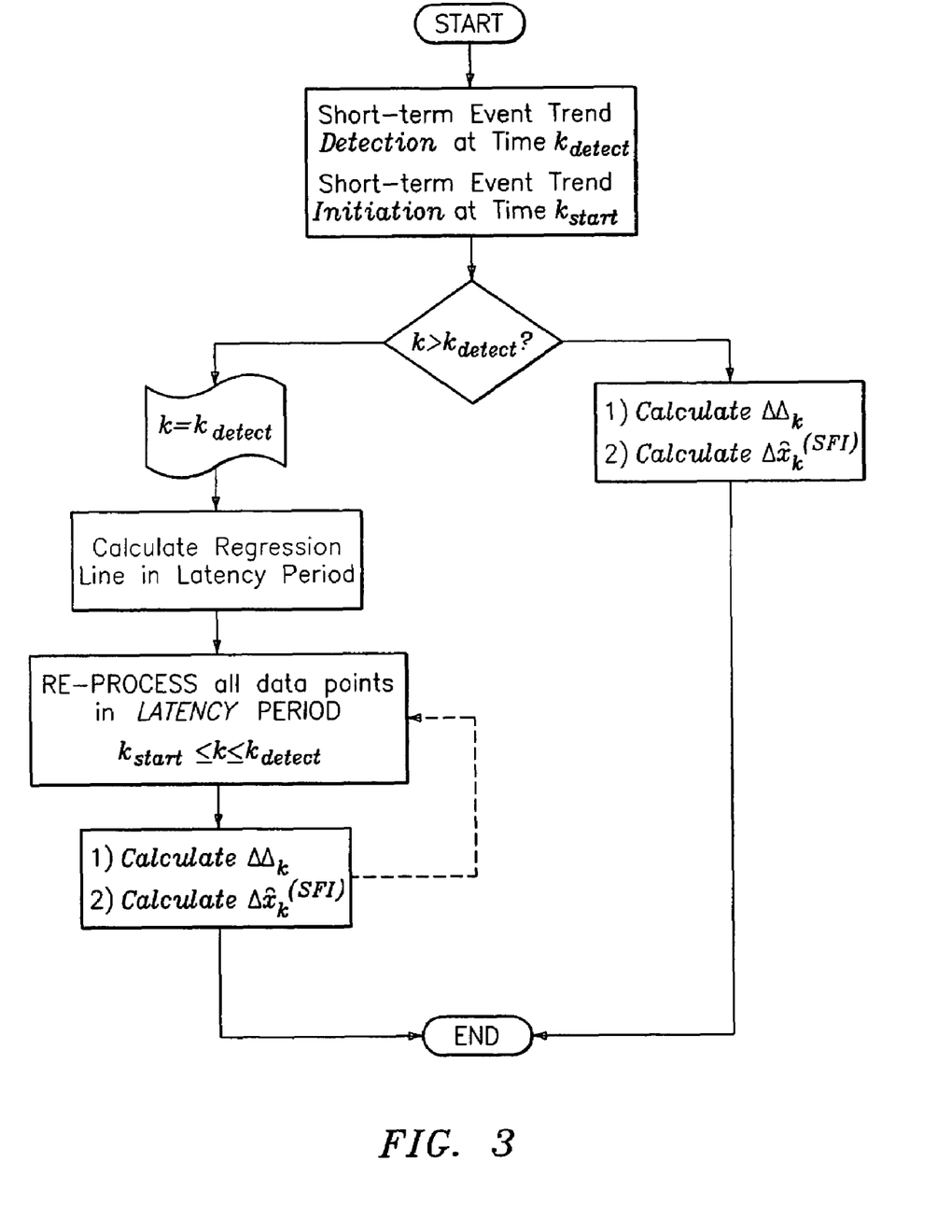
FIG. 3—A logic diagram of the steps of the present invention performed comprising the re-processing of data points in the latency period.

In order to describe the short-term event isolation process, the following notation is introduced:

$Z_k = (m \times 1)$ vector of Measurement Δs at time $k$ $Z_k(i) = i^{th}$ component of the vector of Measurement Δs at time $k$ $\Delta\Delta_k = (m \times 1)$ vector of Measurement ΔΔs at time $k$ $\Delta\Delta_k(i) = i^{th}$ component of the vector of Measurement ΔΔs at time $k$ $\Delta\hat{x}_k^{(SFI)} = (n \times 1)$ vector of estimated SFI Performance ΔΔs at time $k$ $\Delta\hat{x}_k^{(SFI)}(i) = i^{th}$ component of the vector of estimated Performance ΔΔs at time $k$ $A_k = (m \times 1)$ vector of Measurement Δ Averages at time $k$ $A_k(i) = i^{th}$ component of the vector of Measurement Δ Averages at time $k$ $m$ = number of Measured Parameters $n$ = number of potential SFI event faults In order to orchestrate these assessments it is necessary to adhere to the process illustrated in FIG. 3. The inputs into this process are $Z_k$ = vector of Measurement Δs at time k $A_k$ = vector of Measurement Δ Averages at time k The Measurement Δ Averages are preferably computed by using exponential averages which are recursive and require minimal memory. Like a rolling average, this form of averaging also tracks parameter trends over time. They are computed as follows:

$$A_k = \alpha A_{k-1} + (1-\alpha)Z_k$$

$$0 < \alpha < 1$$

where the (pre-chosen) constant α, provides the level of weighting for the past average and current data point.

The $\Delta\Delta_k$ calculations are made relative to the average level just prior to the event initiation, i.e. discrete time $k_{start}-1$. The calculation applies to the entire Blackout Period 29, but differs for the re-processed Latency Period 27. In the Latency Period 27, a linear time regression is performed and the $\Delta\Delta_k$ values are computed as the difference between this regression line and the average level (prior to the event) as outlined below.

Let $n_{Latency}$ = number of points in the Latency Period and the regression coefficients within the latency period are calculated as follows:

$$Time_{avg} = \frac{n_{Latency} + 1}{2}$$

= average discrete time in Latency $$Time_{variance} = \begin{cases} 0 & \text{if } n_{Latency} = 1 \\ \frac{(n_{Latency} + 1)n_{Latency}}{12} & \text{if } n_{Latency} > 1 \end{cases}$$

= variance of discrete time in Latency $$\overline{Z}_{Blackout}(i) = \left(\frac{1}{n_{Latency}}\right) \sum_{k=1}^{n_{Latency}} Z_{k_{start}+k-1}(i)$$

= average of $i^{th}$ parameter $\Delta$ in Latency $$slope_{Latency}(i) = \begin{cases} 0 & \text{if } n_{Latency} = 1 \\ \left(\frac{12}{n_{Latency}(n_{Latency}+1)(n_{Latency}-1)}\right)\sum_{k=1}^{n_{Latency}}[kZ_{k_{start}+k-1}(i)] - \left(\frac{6}{n_{Latency}-1}\right)\overline{Z}_{Blackout}(i) & \text{if } n_{Latency} > 1 \end{cases}$$

= regression slope of $i^{th}$ parameter $\Delta$ in Latency

For each point in the Latency period, the $\Delta\Delta$ value is calculated as follows:

For index=1,2, ..., $n_{Latency}$ $Level_{index}(i) = slope_{Latency}(i)[index-Time_{avg}] + \overline{Z}_{Blackout}(i)$ $\Delta\Delta_{k_{start}+index}(i) = Level_{index}(i) - A_{k_{start}-1}(i)$ $i = 1, 2, \ldots, m$ End For $\Delta\Delta_{Latency}(i) = \Delta\Delta_{k_{start}+n_{Latency}}(i)$ (Final $\Delta\Delta$ in Latency)

This constitutes a re-processing of the measurement information from the inception of the detected event and the time of detection. At time points after detection ($k > k_{detect}$), the $\Delta\Delta_k$ values are computed as the difference from the current Measurement $\Delta$ and the average level (prior to the event), i.e.

$\Delta\Delta_k(i) = Z_k(i) - A_{k_{start}-1}(i), i=1,2,\ldots,m$ for $k > k_{detect}$ Following these steps, there is derived at current time k within a Blackout Period 29 (i.e., $k_{start} \leq k \leq k_{end}$), the $\Delta\Delta_k$ vector quantities, which provide a signature in the Measurement $\Delta$ space representative of the underlying event fault $\Delta \hat{x}_k^{(SFI)}$.

Reprocessing within the Blackout Period 29 allows a separate method to be applied to calculate the incremental change in performance $\Delta\hat{x}_k^{(SFI)}$ due to the event that can then be added back to the known (estimated) performance state $\hat{x}_{k_{start}-1}$ to form a more accurate estimate, i.e., $\hat{x}_k = \hat{x}_{K_{start}-1} + \Delta\hat{x}_k^{(SFI)}$ for $k_{start} \leq k \leq k_{end}$ This mitigates the problem of "fault smearing" in an estimation process for an under-determined system where the number of faults is larger than the number of measurements, i.e. n>m.

Figure 4A:
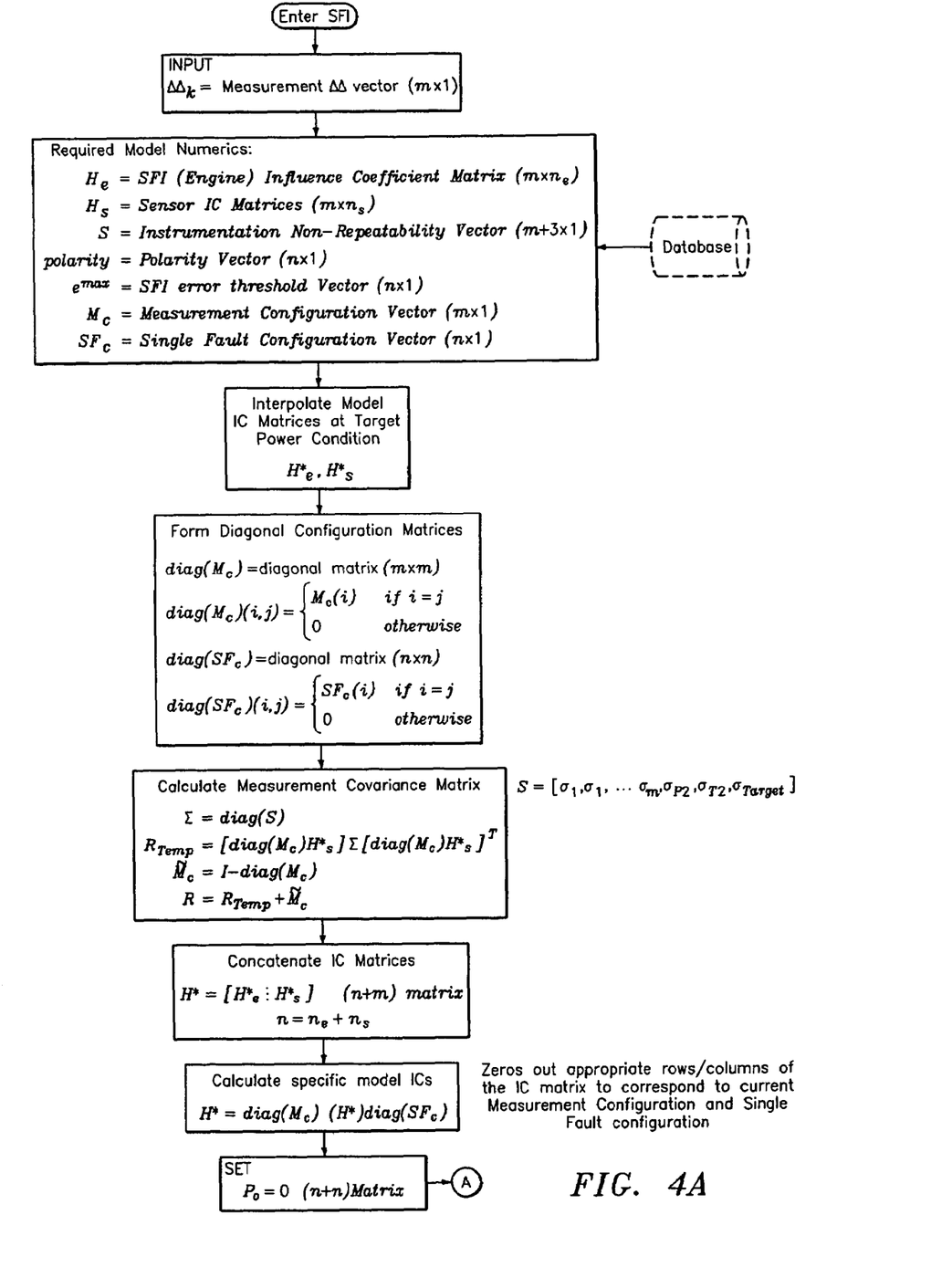
FIG. 4A—A logic diagram of the steps of the present invention performed to calculate the specific model ICs.
Figure 4B:
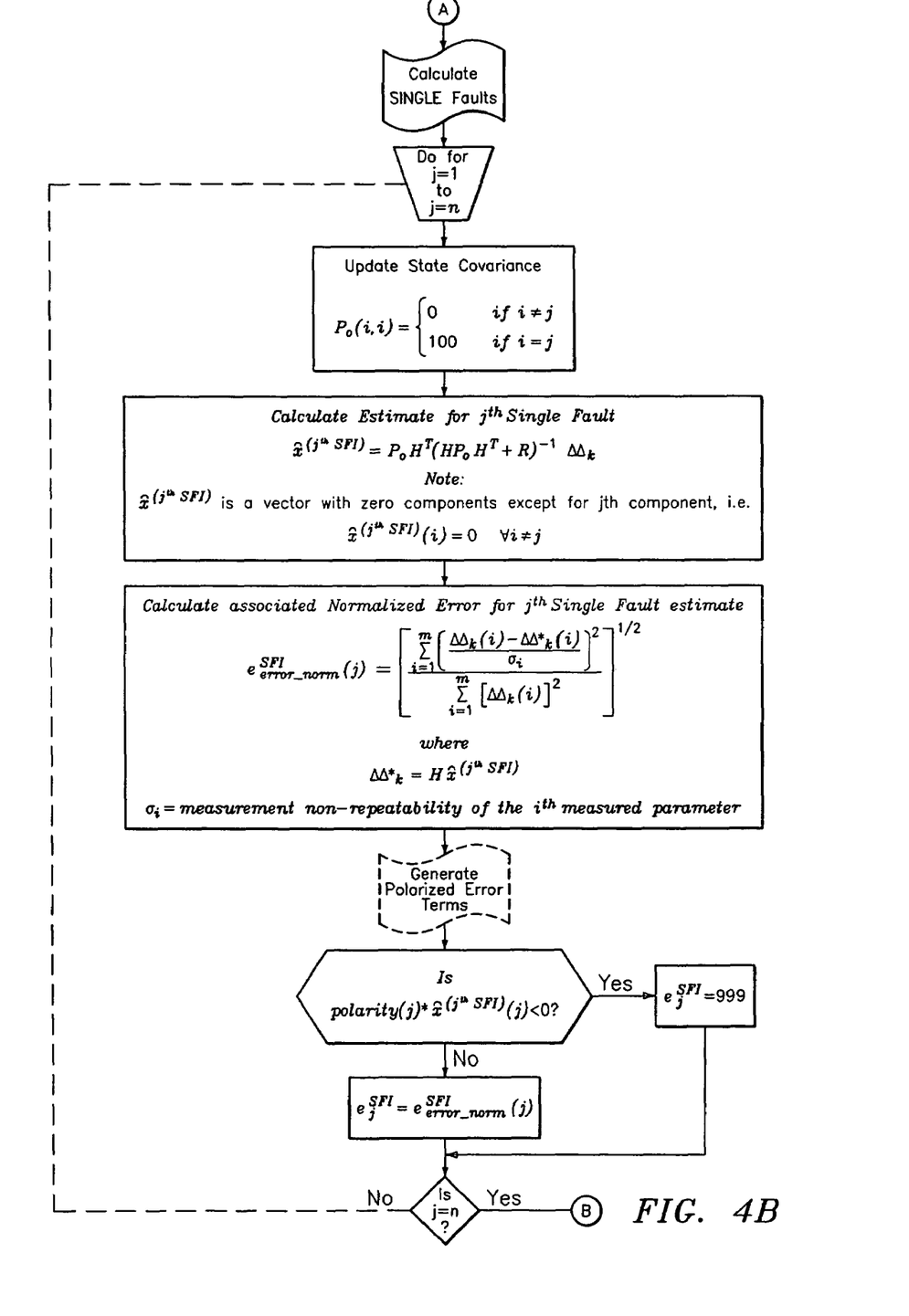
Figure 4C:
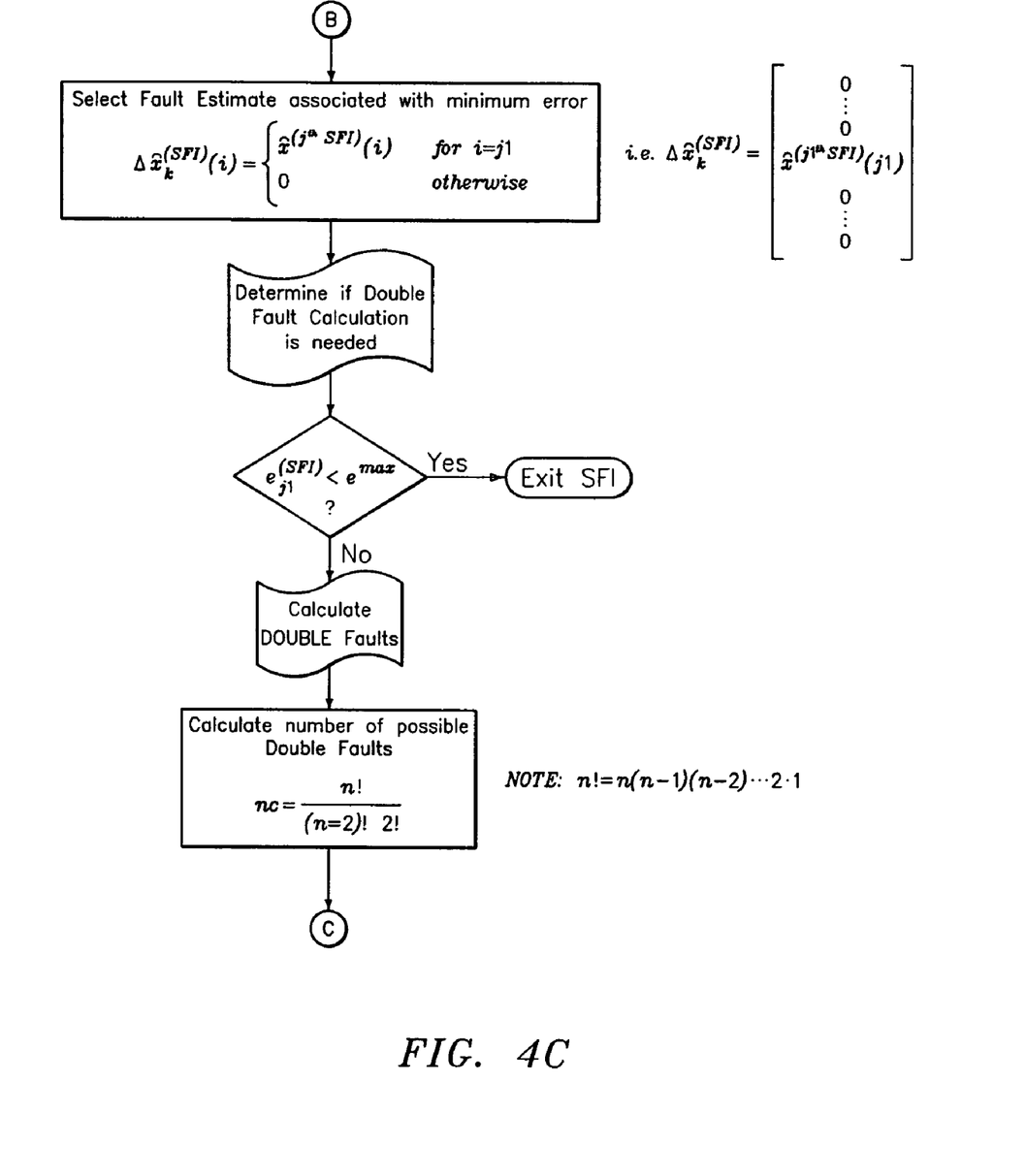
Figure 4D:
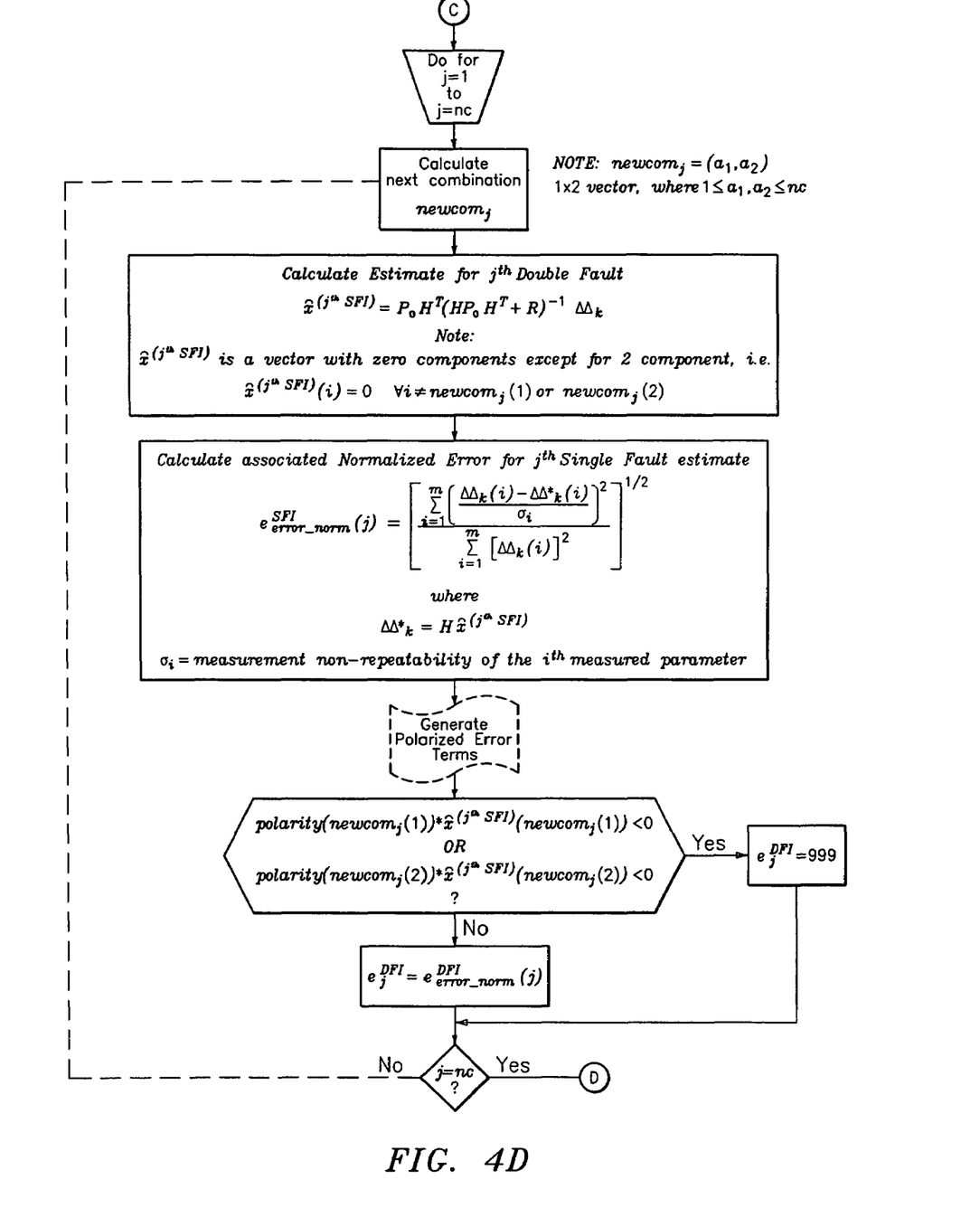
Figure 4E:
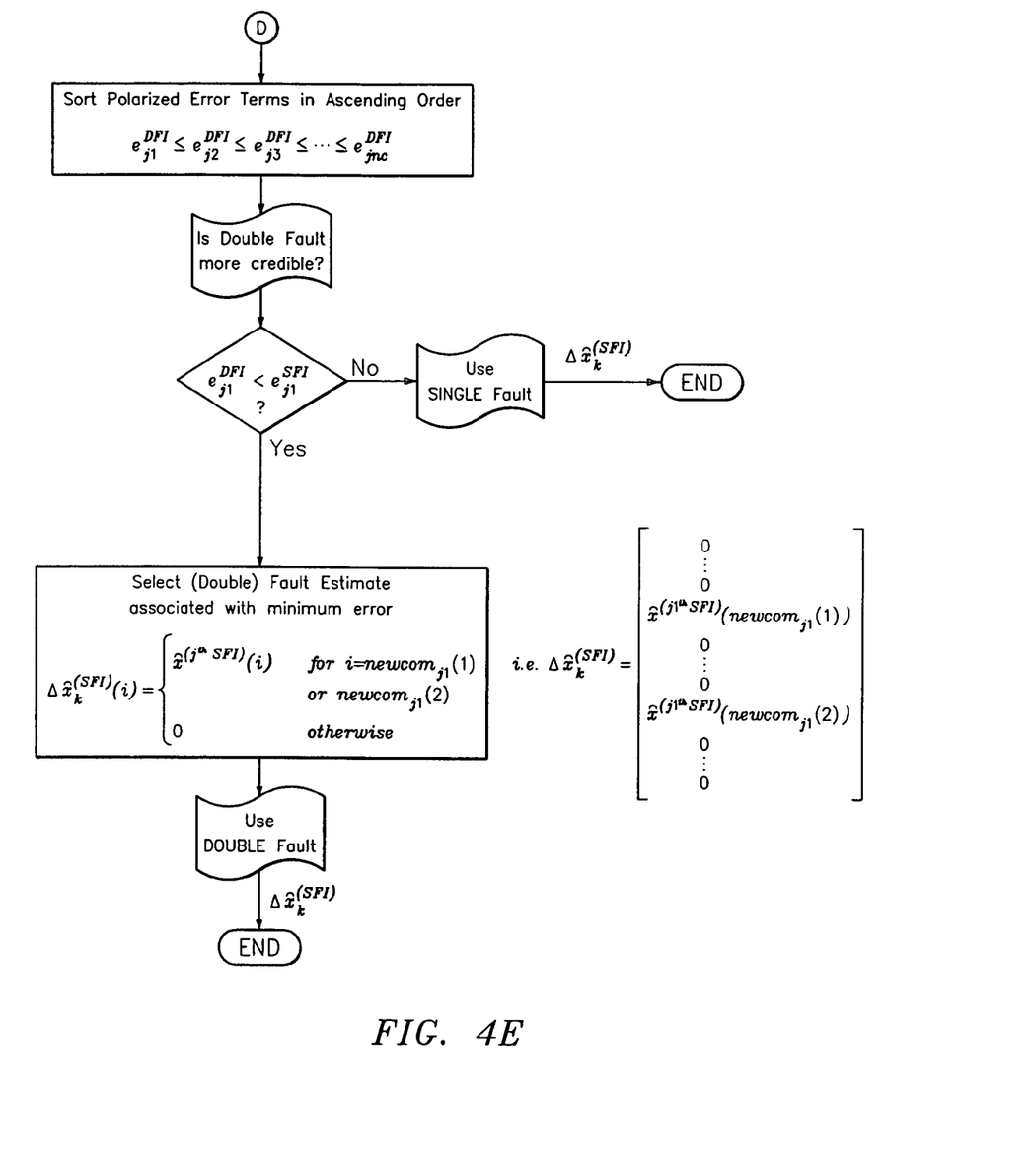

The estimation of the incremental performance element $\Delta \hat{x}_k^{(SFI)}$ is illustrated with reference to FIGS. 4A–4E. FIG. 4A illustrates the steps performed to calculate the specific model Influence Coefficients (ICs) represented my matrices $H_e$ (engine ICs) and $H_s$ (sensor ICs). These matrices consist of partial derivatives which relate percent of point changes in the performance fault parameters to percent of point changes in the measured (observed) parameters and are commonly used for this type of performance diagnostic modeling. The matrix $P_0$ represents the so-called state covariance matrix which is a common design parameter for the Kalman Filter. FIG. 4B illustrates the process steps by which there is calculated an associated normalized error for each single fault estimate and there is generated polarized error terms. FIG. 4C illustrates the process steps by which the polarized error terms are processed to select the fault estimate with the minimum computed error. In addition, a determination is made whether or not to test for a double fault condition. In the event that double fault detection is warranted, FIG. 4D illustrates the process steps whereby normalized and polarized error terms for each possible double fault is calculated. Lastly, in the event that double fault detection was warranted, FIG. 4E illustrates the process steps whereby it is determined whether to conclude the occurrence of a single or a double fault condition.

The S vector of measurement non-repeatabilities contains as its components the 1-standard deviation precision error expected from the associated sensor. The last 3 components are the 1-standard deviation precision errors in the engine inlet pressure and temperature ($P_2$ and $T_2$ respectively) and the target power setting parameter (which varies with the engine model).

The polarity vector is an n×1 vector whose components have values −1, 0, or +1 with the following interpretation:

$$polarity(i) = \begin{cases} -1 & \text{if the } i^{th} \text{ single fault can only} \\ & \text{have a negative value} \\ 0 & \text{if the } i^{th} \text{ single fault can have} \\ & \text{either positive or negative value} \\ +1 & \text{if the } i^{th} \text{ single fault can} \\ & \text{only have a positive value} \end{cases}$$

The use of the polarity vector in the logic appearing in FIGS. 4A–4E allows one to disregard single fault assessments whose evaluation are contrary to what is deemed reasonable by assigning them a large error. For example, engine Module performance will degrade with time (negative) whereas sensor errors can be either positive or negative.

Two other vectors appearing in the logic allow the system to adapt automatically to different engine systems. These take the form of the Measurement Configuration vector ($M_C$) and the Single Fault Configuration vector $SF_C$. They are defined as follows:

$$M_C(i) = \begin{cases} 1 & \text{if } i^{th} \text{ parameter is measured} \\ 0 & \text{otherwise} \end{cases}$$

$$SF_C(i) = \begin{cases} 1 & \text{if } i^{th} \text{ fault is to be included in the search set} \\ 0 & \text{otherwise} \end{cases}$$

It is apparent that there has been provided in accordance with the present invention a method of performing single fault isolation and detection in engine systems. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A method of fault event identification, comprising the steps of:

receiving a plurality of parameter measurements collected from a gas turbine engine;

performing single fault isolation upon said plurality of parameter measurements to establish at least one of said plurality of parameter measurements as an event start parameter measurement of at least one fault event based upon a first performance change of said gas turbine engine, one of said plurality of parameter measurements as an event detect parameter measurement of at least one fault event based upon a second performance change of said gas turbine engine, and one of said parameter measurements as an event end parameter measurement of at least one fault event based upon a third performance change of said gas turbine engine wherein a latency period extends from said event start parameter measurement to said event detect parameter measurement and a blackout period extends from said event start parameter measurement to said event end parameter measurement;

performing multiple fault isolation using said plurality of parameter measurements prior to said event start parameter measurement of said blackout period and after said event end parameter measurement of said blackout period;

reprocessing said parameter measurements from said event start parameter measurement to said event detect parameter measurement of said latency period to improve an estimation of each of a plurality of single fault vectors;

reprocessing said parameter measurements from said event start parameter measurement to said event end parameter measurement of said blackout period to improve said estimation of each of said plurality of single fault vectors;

calculating a said plurality of single fault vectors based upon reprocessing during said latency period and said blackout period;

calculating an estimate for each of said plurality of single fault vectors;

calculating a normalized error for each of said plurality of single fault vectors;

calculating a polarized error term for each of said plurality of single fault vectors;

selecting said single fault vector with the smallest of said calculated normalized errors; and identifying at least one single fault event for said gas turbine engine based upon said single fault vector with the smallest of said calculated normalized errors.

2. The method of claim 1 wherein said performing single fault isolation comprises performing a statistical analysis.

3. The method of claim 1, wherein said performing single fault isolation comprises applying Kalman Filter parameter estimation.

4. The method of claim 1, wherein said plurality of parameter measurements are derived from an engine.

5. The method of claim 1, wherein said reprocessing said parameter measurements comprises the steps of:

computing a linear regression line from said plurality of parameter measurements comprising said latency period; and recomputing each of said plurality of measurements comprising said latency period as a difference between said linear regression line and an average level prior to said event start.

6. The method of claim 1 wherein each of said plurality of parameter measurements comprises a differential of a current measurement and an immediately preceding measurement.

7. The method of claim 6 wherein each of said plurality of parameter measurement is a percentage differential.

8. A method of fault event identification, comprising the steps of:

receiving a plurality of parameter measurements collected from a gas turbine engine;

performing single fault isolation upon said plurality of parameter measurements to establish at least one of said plurality of parameter measurements as an event start parameter measurement of at least one fault event based upon a first performance change of said gas turbine engine, one of said plurality of parameter measurements as an event detect parameter measurement of at least one fault event based upon a second performance change of said gas turbine engine, and one of said parameter measurements as an event end parameter measurements of at least one fault event based upon a third performance change of said gas turbine engine wherein a latency period extends from said event start parameter event to said event detect parameter event and a blackout period extends from said event start parameter event to said event end parameter event;

performing multiple fault isolation using said plurality of parameter measurements prior to said event start parameter measurement of said blackout period and after said event end parameter measurement of said blackout period;

reprocessing said parameter measurements from said event start parameter measurement to said event detect parameter measurement of said latency period to improve an estimation of each of a plurality of single fault vectors;

reprocessing said parameter measurements from said event start parameter measurement to said event end parameter measurement of said blackout period to improve an estimation of each of a plurality of single fault vectors;

calculating said plurality of single fault vectors based upon reprocessing during said latency period and said blackout period;

calculating an estimate for each of said plurality of single fault vectors;

calculating a normalized error for each of said plurality of single fault vectors;

calculating a polarized error term for each of said plurality of single fault vectors; and determining if a double fault calculation is required based upon said polarized error term for each of said plurality of single fault vectors;

calculating a plurality of double fault vectors based upon reprocessing during said latency period and said blackout period;

calculating an estimate for each of said plurality of double fault vectors;

calculating a normalized error for each of said plurality of double fault vectors;

calculating a polarized error term for each of said plurality of double fault vectors comprising a smallest normalized error for each of said plurality of single fault vectors and a smallest normalized error for each of said plurality of double fault vectors; and identifying at least one single fault event or at least one multiple fault event for said gas turbine engine based upon said polarized error term for each of said plurality of double fault vectors.

9. The method of claim 8 comprising the additional steps of:

selecting the smaller of said smallest normalized error for each of said plurality of single fault vectors and said smallest normalized error for each of said plurality of double fault vectors.

10. The method of claim 8 wherein said performing single fault isolation comprises performing a statistical analysis.

11. The method of claim 8, wherein said performing single fault isolation comprises applying Kalman Filter parameter estimation.

12. The method of claim 8, wherein said plurality of parameter measurements are derived from an engine.

13. The method of claim 8, wherein said reprocessing said parameter measurements comprises the steps of:

computing a linear regression line from said plurality of parameter measurements comprising said latency period; and recomputing each of said plurality of measurements comprising said latency period as a difference between said linear regression line and an average level prior to said event start.

14. The method of claim 8 wherein each of said plurality of parameter measurements comprises a differential of a current measurement and an immediately preceding measurement.

15. The method of claim 14 wherein each of said plurality of parameter measurement is a percentage differential.

* * * * *